United States Patent [19]

Fukatsu et al.

[11] Patent Number: 5,569,445
[45] Date of Patent: Oct. 29, 1996

[54] FINE ACICULAR α-FERRIC OXIDE AND PRODUCTION THEREOF

[75] Inventors: Yoshiki Fukatsu, Fukushima; Shinji Nakahara, Osaka; Youichi Yamada, Fukushima; Hideji Yamamoto, Hiroshima; Tatsuya Hida; Mizuho Wada, both of Hiroshima, all of Japan

[73] Assignee: Sakai Chemical Industry Co., Ltd., Osaka, Japan

[21] Appl. No.: 368,203

[22] Filed: Dec. 29, 1994

[30] Foreign Application Priority Data

Dec. 30, 1993 [JP] Japan .................. 5-355003
Feb. 14, 1994 [JP] Japan .................. 6-017586

[51] Int. Cl.$^6$ .................................................. C01G 49/02
[52] U.S. Cl. .................................................. 423/633
[58] Field of Search .................... 423/633, 140, 423/144

[56] References Cited

U.S. PATENT DOCUMENTS

| | | | |
|---|---|---|---|
| 3,198,603 | 8/1965 | MacCallum et al. | 423/633 |
| 4,202,871 | 5/1980 | Matsumoto et al. | 423/633 |
| 4,414,196 | 11/1983 | Matsumoto et al. | 423/633 |
| 4,774,072 | 9/1988 | Arndt et al. | 423/633 |
| 4,826,671 | 5/1989 | Arndt et al. | 423/633 |
| 4,913,890 | 4/1990 | Arndt et al. | 423/633 |

FOREIGN PATENT DOCUMENTS

| | | | |
|---|---|---|---|
| 331054 | 9/1989 | European Pat. Off. | 423/633 |
| 3841590A1 | 2/1987 | Germany . | |
| 57-92592 | 6/1982 | Japan | 423/633 |

OTHER PUBLICATIONS

Copy of European Search Report dated 8 Jun. 1995.

*Primary Examiner*—Steven Bos
*Attorney, Agent, or Firm*—Merchant, Gould, Smith, Edell, Welter & Schmidt, P.A.

[57] ABSTRACT

Disclosed herein is fine acicular α-ferric oxide which has the crystallite diameter ($D_{10\bar{1}4}$) in the direction perpendicular to the ($10\bar{1}4$) plane and the crystallite diameter ($D_{11\bar{2}0}$) in the direction perpendicular to the ($11\bar{2}0$) plane such that their ratio $D_{10\bar{1}4}/D_{11\bar{2}0}$ is in the range of 1–2, and also has a specific surface area of 40–50 m$^2$g. Disclosed also herein is fine acicular α-ferric oxide which has the crystallite diameter ($D_{10\bar{1}4}$) in the direction perpendicular to the ($10\bar{1}4$) plane and the crystallite diameter ($D_{11\bar{2}0}$) in the direction perpendicular to the ($11\bar{2}0$) plane such that their ratio $D_{10\bar{1}4}/D_{11\bar{2}0}$ is the range of 1–2, and also has an average aspect ratio of 10–15 and a specific surface area of 20–40 m$^2$/g. They are produced by wet process including the step of hydrothermal reaction.

5 Claims, 2 Drawing Sheets

FINE ACICULAR α-FERRIC OXIDE AND PRODUCTION THEREOF

BACKGROUND OF THE INVENTION

1. Field of the Invention

This invention relates to fine acicular α-ferric oxide and a process for producing the same by a wet process.

The fine acicular α-ferric oxide according to the invention is useful as a raw material of magnetic powder for magnetic recording because it is composed of discrete void-free particles with a desirable particle size distribution and aspect ratio. In addition, it is also useful as a transparent red pigment and a raw material of ferrite because of its unique crystal growth direction.

2. Description of the Prior Art

Magnetic iron oxide for magnetic recording should meet the following four fundamental requirements. First, it should be free from voids and have a true high density. Voids cause magnetic poles to occur in the vicinity thereof, resulting in partially disturbed spontaneous magnetization, which has an adverse effect on the magnetic properties. Second, it should have a large aspect ratio (l/d), which is a ratio of the major axis (l) to the minor axis (d) of a particle. The larger the aspect ratio, the smaller the demagnetizing field that occurs in magnetic particles. This leads to a greater coercive force. Third, it should have a narrow particle size distribution. A broad particle size distribution has an adverse effect on the switching field distribution (n-SFD), one of the important properties of magnetic tape. Fourth it should be fine in the case where a high recording density is required of magnetic recording medium.

As mentioned above, the most important and fundamental properties of magnetic iron oxide for magnetic recording are particle size, voids, aspect ratio, and particle size distribution. This is true of acicular ferric oxide as a raw material of magnetic powder.

Acicular α-ferric oxide is usually produced by the topotactic reaction or dehydration with heating of ferric oxide hydroxide (α-FeOOH), which undergoes crystal modification while retaining its needle-like shape. The dehydration eliminates 0.5 mol of water from 1 mol of ferric oxide hydroxide, giving rise to crystals containing discrete voids or coalesced voids. The volume of voids accounts for about 30 vol %. Therefore, it such ferric oxide hydroxide is used as a raw material of magnetic powder for magnetic recording, the resulting ferric oxide will also contain voids. This is a hindrance to a high-output magnetic recording medium.

There have been proposed several methods for reducing voids. However, it is theoretically impossible that dehydration forms no voids at all. Even if it should be possible to reduce voids by firing at high temperatures, the firing may present other problems associated with fused particles and poor dispersibility.

For the complete solution of the above-mentioned problems, there have been proposed several improved methods for the direct production of acicular α-ferric oxide which does not need ferric oxide hydroxide (α-FeOOH). They give void-free, discrete particles of acicular α-ferric oxide. Such particles yield acicular α-ferric oxide which is substantially free from voids and has a high density and good magnetic properties.

In what follows, the prior art technologies reported in literature are evaluated in terms of the fineness of particles, which is expressed in relation to the specific surface area. In the case where literature gives no data of specific surface area, estimated values are used which were calculated knowing that the ratio of an actual value to a theoretical value calculated assuming the particle to be cylindrical is abut 1.5. Thus the estimated value is 1.5 times the theoretical value.

Japanese Patent Publication No. 22416/1980 discloses a method which consists of heating at 100°–250° C. an alkaline aqueous slurry composed of ferric hydroxide, citric acid (or a salt thereof), and an alkali compound. This method is claimed to yield particles having a major diameter of 0.5 μm and an aspect ratio of 7. Japanese Patent Publication No. 4694/1980 discloses a method which consists of heating an alkaline aqueous suspension of ferric hydroxide in the presence of at least one organic phosphonic acid compound. This method is claimed to yield particles having a major diameter of 5 μm and a minor diameter of 0.3 μm. The thus obtained ferric oxide particles have an aspect ratio of about 17, but their specific surface area is smaller than 10 $m^2/g$ because of their large particle diameter.

The present inventors' investigation suggests that the two conventional methods could yield particles having a specific surface area up to 40 $m^2/g$. However, such particles are small in aspect ratio and wide in particle size distribution, and hence unsuitable for use as a raw material of magnetic iron oxide for magnetic recording.

Japanese Patent Laid-open No. 216919/1987 discloses a method for producing acicular $α-Fe_2O_3$ by heating at 80°–250° C. an alkaline aqueous suspension of ferric hydroxide in the presence of an organic compound which forms a complex salt with at least ferric ions, said ferric hydroxide being modified with tin(IV) ions. This method is claimed to yield particles having a major diameter of 0.3 μm, an aspect ratio of 10.0, and a specific surface area of 33.0 $m^2/g$. Japanese Patent Laid-open No. 270520/1989 discloses a method which is similar to that just mentioned above but has an advantage over it in not carrying out water washing. This method is claimed to yield particles having a specific surface area of 36.9 $m^2/g$, although nothing is reported about the major diameter and aspect ratio of the particles.

Japanese Patent Laid-open No. 50326/1988 discloses a method which consists of heating an alkaline aqueous suspension of ferric hydroxide in the presence of a tetravalent metal compound alone or in combination with a phosphorus compound and/or hydroxycarboxylic acid compound. This method is claimed to yield particles having a major axis of 0.4 μm, as aspect ratio of 7, and a specific surface area of 24.5 $m^2/g$. Japanese Patent Laid-open No. 162535/1988 discloses a method which consists of incorporating an aqueous suspension of FeOOH (having pH 7 or below) with a phosphorus compound and subjecting it to hydrothermal treatment at a temperature in the range of 100°–130° C. This method is claimed to yield particles having a major axis of 0.8 μm and a specific surface area of about 12 $m^2/g$. The photograph in the literature suggests that the particles have an aspect ratio of about 6–8.

Despite several improvements as mentioned above, no acicular α-ferric oxide has been produced directly by a wet process which is substantially free from voids and so fine as to have a specific surface area in excess of 40 $m^2/g$. In addition, no acicular α-ferric oxide is available which is substantially free from voids and has an aspect ratio greater than 10 and a specific surface area of 20–40 $m^2/g$.

SUMMARY OF THE INVENTION

This invention has been completed to solve the problems involved in conventional acicular α-ferric oxide. Accordingly, it is an object of the present invention to provide acicular α-ferric oxide which is suitable for use, in particular, as a raw material of magnetic powder for magnetic recording, and in addition, as a raw material of transparent red pigment, and ferrite, because it is composed of discrete void-free particles with a desirable particle size distribution and aspect ratio.

It is another object of the invention to provide a process for producing such α-ferric oxide by a wet process.

The first aspect of the present invention resides in α-ferric oxide in the form of fine acicular particles and a process for production thereof, said particles being discrete and substantially free from voids and having a specific surface area greater than 40 m$^2$/g and a desirable aspect ratio and particle size distribution.

The second aspect of the present invention resides in α-ferric oxide in the form of fine acicular particles and a process for production thereof, said particles being substantially free from voids and discrete and having a specific surface area of 20–40 m$^2$/g, an average aspect ratio of 10–15, and a desirable particle size distribution.

Therefore, the invention firstly provides fine acicular α-ferric oxide which has the crystallite diameter ($D_{10\bar{1}4}$) in the direction perpendicular to the $(10\bar{1}4)$ plane and the crystallite diameter ($D_{11\bar{2}0}$) in the direction perpendicular to the $(11\bar{2}0)$ plane such that their ratio $D_{10\bar{1}4}/D_{11\bar{2}0}$ is 1–2, and also has a specific surface area of 40–50 m$^2$/g. This α-ferric oxide will be referred to as the first of the α-ferric oxides of the invention hereinafter.

According to the invention, the first of the fine acicular α-ferric oxides is produced by a process which comprises adding an aqueous solution of ferric salt and an alkaline aqueous solution simultaneously to a vessel, while keeping the resulting mixture at a pH in the range of 7–9 and a temperature of not more than 40° C., thereby providing a suspension of ferric hydroxide in the vessel, filtering the suspension and water-washing the solids, dispersing the solids again in water, such that the amount of $SiO_2$ in the suspension is not more than 30 ppm and the amount of anions originating from the ferric salt used as a starting material is not more than 1000 ppm, aging the suspension of ferric hydroxide at a temperature of 40°–80° C., adding a crystallization controlling agent to the suspension, and subjecting the suspension to hydrothermal reaction.

The invention provides another fine acicular α-ferric oxide which has the crystallite diameter ($D_{10\bar{1}4}$) in the directions perpendicular to the $(10\bar{1}4)$ plane and the crystallite diameter ($D_{11\bar{2}0}$) in the direction perpendicular to the $(11\bar{2}0)$ plane such that their ratio $D_{10\bar{1}4}/D_{11\bar{2}0}$ is 1–2, and also has an average aspect ratio of 10–15 and a specific surface area of 20–40 m$^2$/g. This α-ferric oxide will be referred to as the second of the α-ferric oxides of the invention hereinafter.

According to the invention, the second of the fine acicular α-ferric oxides is produced by a process which comprises adding an alkaline aqueous solution to an aqueous solution of ferric salt until the resulting mixture has a pH in the range of 7–10 while keeping the resulting mixture at a temperature of not more than 30° C., thereby providing a suspension of ferric hydroxide, filtering the suspension and water-washing the solids, dispersing the solids again in water, such that the amount of $SiO_2$ in the suspension is not more than 60 ppm and the amount of anions originating from the ferric salt as a starting material is not more than 2000 ppm, ageing the suspension of ferric hydroxide at a temperature of 40°–100° C., adding a crystallization controlling agent to the suspension, and subjecting the suspension to hydrothermal reaction.

DETAILED DESCRIPTION OF THE INVENTION

Figure 1:
FIG. 1 is an electron photomicrograph (×30000) showing an example of the first of the fine acicular α-ferric oxides of the invention.

The first of the fine acicular α-ferric oxides of the invention is produced by the process which is set forth in detail in the following.

The process starts with the step of simultaneously neutralizing an aqueous solution of ferric salt and an alkaline aqueous solution, or adding the aqueous solution of ferric salt and an alkaline aqueous solution to a vessel simultaneously, while keeping the resulting mixture at a pH in the range of 7–9. This step is herein called simultaneous neutralization, and may be accomplished by adding or pouring the two solutions into a vessel or a container simultaneously. This step yields a suspension of amorphous ferric hydroxide. The invention requires that the resulting mixture should be kept at a temperature of not more than 40° C. The failure to meet this requirement leads to acicular α-ferric oxide having an undesirable particle size distribution.

In addition, the invention requires that the mixture of the aqueous solutions of ferric salt and alkali should have a pH in the range of 7–9. The failure to meet this requirement leads to acicular α-ferric oxide having an undesirable particle size distribution and aspect ratio.

It is to be noted that fine acicular α-ferric oxide having a specific surface area of 40–50 m$^2$/g intended in the invention cannot be obtained if the alkaline aqueous solution is added to the aqueous solution of ferric salt, which method is called herein the forward neutralization, or vice versa, as such a method is herein called the reverse neutralization.

The forward neutralization forms very little dehydrate (as nuclei) at the time of neutralization, and the neutralization product remains mostly ferric hydroxide. Upon hydrothermal reaction, it undergoes the generation of nuclei and the growth of particles simultaneously, which gives rise to coarse particles with a broad particle size distribution.

The reverse neutralization forms dehydrate when the pH of the neutralization product changes from strong alkaline to neutral, but the dehydrate varies in the degree of dehydration (depending on the pH at which dehydration has taken place), which means that the nuclei are not uniform. This ends with the α-ferric oxide having a broad particle size distribution.

By contrast, the simultaneous neutralization, which is carried out with the pH fixed constant at 7–9, forms a large amount of uniform dehydrate having a low degree of dehydration. Therefore, it yields fine particles of α-ferric oxide having a desirable particle size distribution.

Preferred examples of the ferric salt used in the present invention include ferric chloride, ferric sulfate, and ferric nitrate, which are not limitative. Preferred examples of the alkali used in the present invention include hydroxide and oxide of alkali metal and alkaline earth metal (such as sodium hydroxide and potassium hydroxide) and ammonia, which are not limitative.

The simultaneous neutralization forms ferric hydroxide whose concentration may vary in the resulting suspension. The concentration is not specifically limited so long as the suspension can be stirred without difficulties. It is usually lower than 1.0 mol/l, preferably 0.05–0.3 mol/l.

After the simultaneous neutralization, the resulting suspension of ferric hydroxide is filtered, followed by water-washing, to remove salts formed by neutralization. Washing water for this purpose is usually deionized water. According to the invention, it is necessary to use washing-water (or deionized water) containing $SiO_2$ in an amount of not more than 2 ppm, preferably not more than 1 ppm, so that the adsorption of $SiO_2$ by ferric hydroxide is minimized.

According to the invention, the water washing of ferric hydroxide should be carried out such that after washing, the suspension of ferric hydroxide contains $SiO_2$ in an amount of not more than 30 ppm, preferably not more than 20 ppm, and also contains anions originating from the ferric salt used as the starting material in an amount of not more than 1000 ppm, preferably not more than 700 ppm. To this end, it is necessary to adjust the concentration of $SiO_2$ in the washing water and to adjust the amount of the washing water.

It is essential to meet both of the above mentioned requirements for the amount of $SiO_2$ and anions originating from the ferric salts used as the raw material in the suspension (before ageing) in order to obtain the first fine acicular α-ferric oxide according to the invention.

With an excess amount of residual anions, the resulting particles are coarse and have a rough surface. With an excess amount of $SiO_2$, the resulting particles are coarse and have a broad particle size distribution and a low aspect ratio. Moreover, excess $SiO_2$ hinders the reaction that changes ferric hydroxide into ferric oxide, leaving unreacted products. The residual anions as well as $SiO_2$ hinder the action of the crystallization controlling agent.

After water washing, the suspension of ferric hydroxide is aged so that uniform nuclei are formed. The concentration of iron in the suspension should preferably be in the range of 0.3–1.0 mol/l. Ageing should be carried out at a temperature of 40°–80° C. for 2–4 hours, with the pH adjusted to 7–8. With a temperature lower than 40° C., ageing does not produce the desired effect. With a temperature higher than 80° C., aging results in a broad particle size distribution. Aging shorter than 2 hours is not effective, and ageing longer than 4 hours results in a broad particle size distribution. As mentioned above, the ageing conditions greatly affect the particle size and particle size distribution of the resulting ferric oxide. Although the above mentioned simultaneous neutralization and water washing (without aging) give fine particles of ferric oxide having a desirable aspect ratio and particle size distribution, aging improves the aspect ratio and particle size distribution.

After aging, the suspension of ferric hydroxide is provided with a crystallization controlling agent, which, due to coordination with iron, controls the direction and rate of the crystal growth of ferric oxide, thereby giving rise to acicular particles. The use of such a crystallization controlling agent in the production of ferric oxide is already known. For example, Japanese Patent Publication No. 29646/1985 discloses the use of polycarboxylic acid, hydroxycarboxylic acid, aminocarboxylic acid, polyamine, organic phosphonic acid, thiocarboxylic acid, polyhydric alcohol, β-dicarbonyl compound, and aromatic sulfonic acid. Their water soluble salts and esters may be used so long as they are capable of coordination to iron. Of these compounds, desirable ones are exemplified by citric acid, tartaric acid, aminotri(methylenephosphonic acid), ethylenediaminotetra(methylenephosphonic acid), and ethylene-1,1'-diphosphonic acid.

The amount of the crystallization controlling agent is not specifically limited so long as it is enough to control the direction and rate of the crystal growth of α-ferric oxide in the hydrothermal reaction. However, it is usually in the range of $1 \times 10^{-5}$ to $1 \times 10^{-1}$ mol, preferably $1 \times 10^{-4}$ to $1 \times 10^{-2}$ mol, per mol of ferric hydroxide. With an excessively small amount of the agent, it is difficult to produce α-ferric oxide having a high aspect ratio, while with an excessively large amount, the reaction takes a long time.

The process of the invention ends with hydrothermal reaction which is performed on the suspension of ferric hydroxide which has been treated as mentioned above. This hydrothermal reaction is carried out by heating the suspension at a temperature of more than 100° C., with its pH adjusted to 9–11 with an alkali. Examples of the alkali include sodium hydroxide, potassium hydroxide and ammonia. The alkali may be added to the suspension of ferric hydroxide before or after the addition of the crystallization controlling agent.

The hydrothermal reaction should be carried out at a temperature of not less than 100° C., and practically and preferably at a temperature of more than 100° C. The upper limit depends on the decomposition temperature of the crystallization controlling agent. The duration of the hydrothermal reaction should be from several tens of minutes to several hours. With a reaction temperature lower than 100° C., the resulting particles of ferric oxide take on a cross shape or T shape and contain FeOOH, leading to insufficient discreteness and a low aspect ratio.

From the practical standpoint, the hydrothermal reaction temperature is preferably in the range of 105°–250° C., more preferably in the range of 110°–230° C., and most preferably in the range of 130°–200° C. The thus obtained first acicular α-ferric oxide differs in crystallite from the acicular α-ferric oxide obtained by dehydrogenation of α-FeOOH. In other words, the former acicular α-ferric oxide (A) of the invention differs from the latter (B) in the crystallite diameter ($D_{10\bar{1}4}$) in the direction perpendicular to the $(10\bar{1}4)$ plane and the crystallite diameter ($D_{11\bar{2}0}$) in the direction perpendicular to the $(11\bar{2}0)$ plane, as shown in Table 1. The data in Table 1 are average values of several measurements.

TABLE 1

| | A (Å) | B (Å) |
|---|---|---|
| $D_{10\bar{1}4}$ | 350 | 160 |
| $D_{11\bar{2}0}$ | 250 | 240 |
| $D_{10\bar{1}4}/D_{11\bar{2}0}$ | 1.4 | 0.7 |

It is apparent from Table 1 that the two kinds of α-ferric oxides A and B do not greatly differ in $D_{11\bar{2}0}$ but they do in $D_{10\bar{1}4}$. In other words, $D_{10\bar{1}4}$ of the α-ferric oxide A is nearly twice that of the α-ferric oxide B. This suggests that the crystallite of the oxide A has grown in the direction of the C axis more than that of the oxide B. The probable reason for this is that the growth of the crystal plane parallel to the C axis is inhibited by the crystallization controlling agent.

It is considered that the first of the acicular α-ferric oxide of the invention has the long axis of particle in the [0001] direction. It is also considered according to topotaxis that the long axis of particle is in the [111] direction if the acicular α-ferric oxide is modified into γ-ferric oxide by the known method. It follows that the direction of the long axis coincides with the easy direction of magnetization (or the [111]

direction) due to the magnetic anisotropy of crystals of γ-ferric oxide. On the other hand, it is known that acicular α-ferric oxide obtained from α-FeOOH has the long axis in the [11$\bar{2}$0] direction. Thus the direction of the long axis differs by about 35° from the easy direction of magnetization due to the magnetic anisotropy of crystals.

This difference in direction affects the contribution to coercive force due to the magnetic anisotropy of crystals. If it is assumed that acicular γ-ferric oxide obtained from acicular α-ferric oxide of the invention has the same particle shape as acicular γ-ferric oxide obtained from α-FeOOH, the coercive force of the former would be 1.2 times greater than that of the latter because 1/cos 35° is nearly equal to 1.2.

As mentioned above, the process of the invention is designed to produce acicular α-ferric oxide directly from an aqueous suspension of ferric hydroxide. It is characterized in that the ferric oxide is prepared by the simultaneous neutralization of an ferric salt with an alkali and the resulting ferric hydroxide is washed with water and then aged under specific conditions and is finally subjected to hydrothermal reaction. In this way it is possible to obtain fine particles of acicular α-ferric oxide having a specific surface area of 40–50 m$^2$/g which has never been achieved by the conventional technology. In addition, the thus obtained particles are of discrete structure and have a desirable particle size distribution and aspect ratio.

Such fine acicular α-ferric oxide can be made into a fine magnetic powder which is suitable for use as a magnetic recording medium for high density recording.

The invention further provides the second of the fine acicular α-ferric oxides which has the crystallite diameter ($D_{10\bar{1}4}$) in the direction perpendicular to the (10$\bar{1}$4) plane and the crystallite diameter ($D_{11\bar{2}0}$) in the direction perpendicular to the (11$\bar{2}$0) plane such that their ratio $D_{10\bar{1}4}/D_{11\bar{2}0}$ is in the range of 1–2, and also has an average aspect ratio of 10–15 and a specific surface area of 20–40 m$^2$/g.

According to the invention, the second fine acicular α-ferric oxide is produced by a process which comprises adding an alkaline aqueous solution to an aqueous solution of ferric salt until the resulting mixture has a pH in the range of 7–10 while keeping the resulting mixture at a temperature not more than 30° C., thereby providing a suspension of ferric hydroxide, filtering the suspension and water-washing the solids, dispersing the solids again in water, such that the amount of SiO$_2$ in the suspension is not more than 60 ppm and the amount of anions originating from the ferric salt used as a starting material is not more than 2000 ppm, aging the suspension of ferric hydroxide at a temperature of 40°–100° C., adding a crystallization controlling agent to the suspension, and then subjecting the suspension to hydrothermal reaction.

The second fine acicular α-ferric oxide of the invention is prepared by the process which is set forth in detail in the following.

The process starts with the step of adding an alkaline aqueous solution to an aqueous solution of ferric salt to provide a suspension of amorphous ferric hydroxide. This step should be carried out such that the resulting mixture is kept at at a temperature of not more than 30° C. throughout the step and the finally obtained suspension has a pH in the range of 7–10. Neutralization at a temperature higher than 30° C. will adversely affect the particle size distribution of the resulting acicular α-ferric oxide. Suspension with a pH value outside the specified above range will also adversely affect the aspect ratio and particle size distribution of the resulting acicular α-ferric oxide.

The second α-ferric oxide is prepared from a ferric salt, which is the same as that used for the first α-ferric oxide. Examples of the ferric salt include ferric chloride, ferric sulfate, and ferric nitrate. The ferric salt is neutralized with an alkali, which is the same as that used for the first α-ferric oxide. Examples of the alkali include hydroxide and oxide of alkali metal and alkaline earth metal such as sodium hydroxide and potassium hydroxide, and ammonia. The resulting suspension of ferric hydroxide may vary in concentration. The concentration is not specifically limited so long as the suspension can be stirred without difficulties. However, it is usually not more than 1.0 mol/l, and preferably not more than 0.05–0.3 mol/l.

Subsequently, the suspension of ferric hydroxide is filtered and washed with water to remove salts formed by neutralization. The water washing should be carried out such that after washing, the suspension of ferric hydroxide contains SiO$_2$ in an amount not more than 60 ppm, preferably not more than 40 ppm, and also contains anions originating from the ferric salt used as the starting material in an amount not more than 2000 ppm, preferably not more than 1500 ppm. To this end, it is necessary to adjust the concentration of SiO$_2$ in the washing water and to adjust the amount of the washing water.

For the second acicular α-ferric oxide to have a desirable aspect ratio and particle size distribution, it is necessary to meet the above mentioned two requirements for the amount of SiO$_2$ in the suspension of ferric hydroxide before ageing, and the amount of anions originating from ferric salt used as the starting material. Otherwise, the desired acicular α-ferric oxide will not be obtained. An excess amount of residual anions will lower the aspect ratio, and an excess amount of SiO$_2$ will have an adverse effect on the particle size distribution.

The process for producing the second one of the acicular α-ferric oxide involves the step of aging the suspension of ferric hydroxide after water-washing so that uniform nuclei are formed, as in the case of the first acicular α-ferric oxide.

Aging may be carried out under the same conditions as in the case of the first α-ferric oxide. That is, the suspension of ferric hydroxide is kept at a temperature of 40°–100° C., for 2–4 hours, with the concentration of ferric hydroxide adjusted to 0.1–1.0 mol/l and the suspension adjusted to a pH of 7–8.

After aging the suspension of ferric hydroxide is provided with a crystallization controlling agent. The preferred examples and the adequate amount of the crystallization controlling agent are as set forth hereinbefore.

Finally, the aged suspension of ferric hydroxide is subjected to hydrothermal reaction under the same conditions as in the case of the first acicular α-ferric oxide. The reaction produce is cooled, filtered, washed with water, and dried in the usual way. Thus, there is obtained the second acicular α-ferric oxide according to the invention.

The thus obtained second one of the acicular α-ferric oxide differs in crystallite from the acicular α-ferric oxide obtained by dehydrogenation by heating of α-FeOOH. In other words, they differ in the crystallite diameter ($D_{10\bar{1}4}$) in the direction perpendicular to the (10$\bar{1}$4) plane and the crystallite diameter ($D_{11\bar{2}0}$) in the direction perpendicular to the (11$\bar{2}$0) plane. The former has a ratio of $D_{10\bar{1}4}/D_{11\bar{2}0}$ in the range of 1–2, whereas the latter has a ratio of $D_{10\bar{1}4}/D_{11\bar{2}0}$ in the range of 0.5–0.9. This suggests that the crystallite in the second acicular α-ferric oxide grows well in the direction of C axis. It is considered that the long axis of the particle is in the [0001] direction.

It is considered that if the second acicular α-ferric oxide is modified into γ-ferric oxide by the known method, the long axis will be in the [111] direction. It follows that the direction of the long axis coincides with the easy direction of magnetization of γ-ferric oxide. This is desirable for coercive force in view of the fact that the acicular γ-ferric oxide obtained from α-FeOOH has the long axis in the [110] direction.

The second of the acicular α-ferric oxides obtained as mentioned above has a desirable particle size distribution. When it is modified into acicular γ-ferric oxide for magnetic tape by the known method, the resulting magnetic tape will have a small value of switching field distribution (n-SFD). Moreover, the second of the acicular α-ferric oxides will have an aspect ratio as high as 10–15 depending on the manufacturing conditions, which has never been achieved by the conventional technology. This contributes to the coercive force of acicular γ-ferric oxide formed by modification subsequently.

As set forth above, the invention permits the production of acicular α-ferric oxide directly from an aqueous suspension of ferric hydroxide by the steps of neutralizing an ferric salt with an alkali, washing with water the resulting ferric oxide under specific conditions, aging it under specific conditions, and finally subjecting it to hydrothermal reaction. The thus obtained acicular α-ferric oxide is composed of fine discrete particles having an average aspect ratio of 10–15, a specific surface area of 20–40 m$^2$/g, and a desirable particle size distribution.

Being free from voids and discrete and having a desirable aspect ratio and particle size distribution, the second acicular α-ferric oxide can be made into acicular γ-ferric oxide which is suitable for magnetic tape having a small value of switching field distribution (n-SFD). In addition, the process of the invention yields acicular α-ferric oxide having a desirable aspect ratio under adequate conditions. Such α-ferric oxide is suitable for use as a raw material of acicular γ-ferric oxide for magnetic recording.

EXAMPLES

The invention will be described with reference to the following examples, which are not intended to restrict the scope of the invention.

Part A

Production and use of the first of the α-ferric oxides of the invention

In this part of the example, the process involves water-washing which is carried out by repeating filtration and resuspension. The object of water-washing and resuspension is to control the amount of anions (original from ferric oxide used as the starting material) and the amount of $SiO_2$ (originating from the washing water). Also, in this part of the example, the process employs ferric chloride as the ferric salt which is the starting material. The amount of chlorine ions in the suspension was determined by titration with silver nitrate, and the amount of $SiO_2$ was determined by absorptiometry with molybdenum blue.

The major diameter and aspect ratio of the particles were measured through electron photomicrographs. The specific surface area of the panicles was measured by the BET method that employs nitrogen gas. The diameter of crystallite was calculated according to Scherrer's formula from the half width of the profile obtained by an X-ray diffractometer. The magnetic properties of the magnetic powder and magnetic tape were measured using a vibrating sample magnetometer (VSM).

Example 1

Crystalline ferric chloride was dissolved in deionized water (containing 0.1 ppm of $SiO_2$) to give an aqueous solution containing 23.9 g of iron per liter. Sodium hydroxide was separately dissolved in deionized water to give an aqueous solution containing 51.4 g of sodium hydroxide per liter.

A vertically long container having an effective capacity of 25 liters was filled with 6 liters of deionized water. Into the container were added the aqueous solution of ferric chloride and the aqueous solution of sodium hydroxide simultaneously at a rate of 100 ml/minute with vigorous stirring, while keeping the resulting slurry at a pH of 7.5 and at a temperature of 30° C. Under a equilibrium state, there was obtained a reddish brown suspension of ferric hydroxide (20 liters).

This suspension underwent filtration, resuspension, and water-washing repeatedly. The resulting cake containing 16.7 g of iron was dispersed into deionized water to give 0.5 liter of suspension. This suspension was found to contain 83 ppm of chloride ions and 3.0 ppm of $SiO_2$. After adjustment to pH of 7.5 and heating to 55° C., the suspension was aged for 3 hours with stirring.

To the aged suspension was added 0.53 g of aminotri-(methylenephosphonic acid), and after adjustment to pH of 10.0, the suspension was charged into a closed vessel and heated to 150° C. with stirring. The suspension was stirred at 150° C. for 90 minutes for hydrothermal reaction.

After the completion of the reaction, the reaction product was cooled, filtered, washed with water, and dried in the usual way to give the desired acicular α-ferric oxide.

The thus obtained particles were found to have a specific surface area of 48.2 m$^2$/g, an average major diameter of 0.20 μm, and an average aspect ratio of 7.5. $D_{10\bar{1}4}$ was found to be 348 Å and $D_{11\bar{2}0}$ was found to be 251 Å with the ratio of $D_{10\bar{1}4}/D_{11\bar{2}0}$ being 1.39.

The structure of the fine particles of the acicular α-ferric oxide is shown in FIG. 1 which is an electron photomicrograph (×3000).

Comparative Example 1

Crystalline ferric chloride was dissolved in deionized water to give an aqueous solution (10 liters) containing 23.9 g of iron per liter. To this solution was added an aqueous solution containing 51.4 g of sodium hydroxide per liter until the mixture had a pH of 7.5. Thus there was obtained a reddish brown suspension of ferric hydroxide (about 20 liters). The suspension was treated in the same manner as in Example 1 to give acicular α-ferric oxide.

The resulting particles were found to have a specific surface area of 31.2 m²/g, an average major diameter of 0.30 μm and an average aspect ratio of 10.0.

Example 2

The same procedure as in Example 1 was repeated, except that the degree of water washing was decreased. The amount of chloride ions and $SiO_2$ in the suspension (0.5 liter) was found to be 800 ppm and 2.0 ppm, respectively.

The resulting particles were found to have a specific surface area of 42.5 m²/g, an average major diameter of 0.23 μm and an average aspect ratio of 7.5. $D_{10\bar{1}4}$ was found to be 425 Å and $D_{11\bar{2}0}$ was found to be 260 Å with the ratio of $D_{10\bar{1}4}/D_{11\bar{2}0}$ being 1.63.

Example 3

The same procedure as in Example 1 was repeated except that the deionized water was replaced with water containing 2.0 ppm of $SiO_2$ which was prepared by mixing deionized water with industrial water (containing 7 ppm of $SiO_2$). There was obtained a suspension (0.5 liter) containing 89 ppm of chloride ions and 28 ppm of $SiO_2$.

The resulting particles were found to have a specific surface area of 43.1 m²/g, an average major diameter of 0.21 μm, and an average aspect ratio of 6.6. $D_{10\bar{1}4}$ was found to be 283 Å and $D_{11\bar{2}0}$ was found to be 258 Å with the ratio of $D_{10\bar{1}4}/D_{11\bar{2}0}$ being 1.10.

Comparative Example 2

The same procedure as in Example 1 was repeated, except that the degree of water washing was decreased farther than in Example 2. The amount of chloride ions and $SiO_2$ in the suspension (0.5 liter) was found to be 1760 ppm and 1.7 ppm, respectively.

The resulting particles were found to have a specific surface area of 35.7 m²/g, an average major diameter of 0.26 μm, and an average aspect ratio of 7.2.

Comparative Example 3

The same procedure as in Example 1 was repeated, except that the deionized water was replaced with water containing 4.0 ppm of $SiO_2$ which was prepared by mixing deionized water with industrial water. There was obtained a suspension (0.5 liter) containing 380 ppm of chloride ions and 43 ppm of $SiO_2$.

The resulting particles were found to have a specific surface area of 32.1 m²/g, an average major diameter of 0.27 μm and an average aspect ratio of 6.0.

Figure 2:
FIG. 2 is an electron photomicrograph (×30000) showing an example of fine acicular α-ferric oxide produced by the conventional method.

The structure of the fine particles of the acicular α-ferric oxide is shown in FIG. 2 which is an electron photomicrograph (×30000).

Comparative Example 4

The same procedure as in Example 1 was repeated, except that aging was not carried out.

The resulting particles were found to have a specific surface area of 38.0 m²/g, an average major diameter of 0.23 μm and an average aspect ratio of 7.0.

Comparative Example 5

Two samples of acicular α-FeOOH varying in particle diameter were prepared by blowing air into a suspension of ferrous hydroxide formed from ferrous sulfate and alkali. Each sample was dehydrated by heating at 650° C. for 1 hour. Thus there were obtained two samples of acicular α-ferric oxide each having a specific surface area of 42.0 m²/g and 48.3 m²/g.

The first sample had the crystallite diameter ($D_{10\bar{1}4}$ and $D_{11\bar{2}0}$) of 157 Å and 245 Å, respectively, with the ratio of $D_{10\bar{1}4}/D_{11\bar{2}0}$ being 0.64.

The second sample had the crystallite diameter ($D_{10\bar{1}4}$ and $D_{11\bar{2}0}$) of 151 Å and 237 Å, respectively, with the ratio of $D_{10\bar{1}4}/D_{11\bar{2}0}$ being 0.64.

Example 4

The acicular α-ferric oxide obtained in Example 1 was made into acicular γ-ferric oxide by reduction and oxidation which is know per se. The resulting particles were found to have a coercive force (Hc) of 406 Oe (oersted) and a saturation magnetization ($\sigma_2$) of 70.5 emu/g.

Magnetic tape was prepared with this acicular γ-ferric oxide as follows. One hundred parts by weight of the acicular γ-ferric oxide was dispersed in a resin solution composed of nitrocellulose (5 parts by weight), vinyl chloride-vinyl acetate copolymer (2.5 parts by weight), polyurethane (17.5 parts by weight), and solvent (253 parts by weight). The resulting magnetic paint was coated onto a polyester film, followed by orientation in a magnetic field and drying. Thus there was obtained a magnetic tape having a coating film (or magnetic layer) about 5 μm thick.

The magnetic tape was found to have coercive force equal to 410 Oe, squareness ratio (SR) equal to 0.82, and switching field distribution (n-SFD) equal to 0.39.

Comparative Example 6

The acicular α-ferric oxide (having a specific surface area of 48.3 m²/g) obtained in Comparative Example 5 was made into acicular α-ferric oxide by reduction and oxidation in the same manner as in Example 4. The resulting particles were found to have a coercive force of 385 Oe and a saturation magnetization of 69.2 emu/g.

Magnetic tape was prepared with this acicular γ-ferric oxide in the same manner as in Example 4. The resulting magnetic tape was found to have coercive force of 388 Oe, a squareness ratio (SR) of 0.78, and a switching field distribution (n-SFD) of 0.47.

Part B

Production and use of the second of the α-ferric oxides of the invention

The amount of chloride ions in the suspension was determined by titration with silver nitrate, and the amount of $SiO_2$ was determined by absorptiometry with molybdenum blue.

The resulting acicular α-ferric oxide was tested for specific surface area, average aspect ratio, $D_{10\bar{1}4}$, $D_{11\bar{2}0}$, and $D_{10\bar{1}4}/D_{11\bar{2}0}$ ratio. The specific surface area was determined by the BET method. The aspect ratio was determined using an electron photomicrograph and expressed in terms of an average of 50 measurements. The crystallite diameter was calculated according to Scherrer's formula from the half width of the profile obtained by using an X-ray diffractometer (made by Rigaku Denki Co., Ltd.). The diffractometry employed CuKα line and a Ni filter.

The resulting acicular α-ferric oxide was made into acicular γ-ferric oxide through reduction and oxidation by the known method. A magnetic tape was prepared with it. The acicular γ-ferric oxide was tested for coercive force and saturation magnetization, and the magnetic tape was tested for switching field distribution using a vibrating sample magnetometer (VSM).

The magnetic tape was prepared in the following manner. One hundred parts by weight of the acicular γ-ferric oxide was dispersed in a resin solution composed of nitrocellulose (5 parts by weight), vinyl chloride-vinyl acetate copolymer (2.5 parts by weight), polyurethane (17.5 parts by weight), and solvent (253 parts by weight). The resulting magnetic paint was coated onto a polyester film, followed by orientation in a magnetic field and drying. Thus there was obtained a magnetic tape having a coating film (or magnetic layer) about 5 μm thick.

Examples 1 to 4 and Comparative Examples 1 and 2

Crystalline ferric chloride was dissolved in deionized water (containing 0.1 ppm of $SiO_2$) to give an aqueous solution containing 12.7 g of iron per liter. Sodium hydroxide was separately dissolved in deionized water to give an aqueous solution containing 200 g of sodium hydroxide per liter.

The aqueous solution of sodium hydroxide was slowly added with stirring to 4.4 liters of the aqueous solution of ferric chloride until the pH value of the reaction product reached 8.5 while maintaining the mixture at a temperature of 10° C. Thus there was obtained a suspension of reddish brown ferric hydroxide.

This suspension underwent filtration, resuspension, and water-washing repeatedly. The resulting cake containing 16.7 g of iron was dispersed into deionized water to give 0.5 liter of suspension. After adjustment to pH of 7.5 and heating to 70° C., the suspension was aged for 3 hours with stirring.

To the aged suspension was added 0.63 g of aminotri-(methylenephosphonic acid). After adjustment of pH of 10.0, the suspension was charged into a closed vessel and heated to 150° C. with stirring. The suspension was stirred at 150° C. for 90 minutes for hydrothermal reaction.

After the completion of the reaction, the reaction product was cooled, filtered, washed with water, and dried in the usual way. Thus there was obtained acicular 60 -ferric oxide.

In addition, five suspensions (0.5 liter each), which differed in concentrations of chloride ions and $SiO_2$, were prepared in the same manner as above except that water containing $SiO_2$ in different amounts was used and the degree of water washing was changed. From these suspensions were obtained five samples of acicular α-ferric oxide in the same manner as mentioned above.

The results are shown in Table 2.

TABLE 2

|  |  | Examples | | |
|---|---|---|---|---|
|  |  | 1 | 2 | 3 |
| Water washing | Concentration of $SiO_2$ (ppm) | 2.5 | 37 | 20 |
|  | Concentration of chloride ions (ppm) | 210 | 540 | 1180 |
| Properties of acicular α-ferric oxide | Specific surface area (m²/g) | 34.0 | 30.9 | 31.8 |
|  | Aspect ratio | 14 | 10 | 9 |
|  | $D_{10\bar{1}4}$ (Å) | 340 | 298 | 432 |
|  | $D_{11\bar{2}0}$ (Å) | 270 | 259 | 273 |
|  | $D_{10\bar{1}4}/D_{11\bar{2}0}$ | 1.26 | 1.15 | 1.58 |
| Properties of acicular γ-ferric | Coercive force (Oe) | 415 | 413 | 416 |
|  | Saturation magnetization oxide (emu/g) | 71.2 | 71.7 | 71.6 |
| Properties of magnetic tape | Switching field distribution | 0.29 | 0.34 | 0.32 |

|  |  | Examples | Comparative Examples | |
|---|---|---|---|---|
|  |  | 4 | 1 | 2 |
| Water washing | Concentration of $SiO_2$ (ppm) | 12 | 84 | 8.0 |
|  | Concentration of chloride ions (ppm) | 1630 | 170 | 3420 |
| Properties of acicular α-ferric oxide | Specific surface area (m²/g) | 30.2 | 26.3 | 28.5 |
|  | Aspect ratio | 8 | 8 | 7 |
|  | $D_{10\bar{1}4}$ (Å) | 408 | 320 | 413 |
|  | $D_{11\bar{2}0}$ (Å) | 285 | 258 | 277 |
|  | $D_{10\bar{1}4}/D_{11\bar{2}0}$ | 1.43 | 1.24 | 1.49 |
| Properties of acicular γ-ferric | Coercive force (Oe) | 415 | 412 | 410 |
|  | Saturation magnetization oxide (emu/g) | 71.6 | 72.0 | 71.8 |
| Properties of magnetic tape | Switching field distribution | 0.32 | 0.42 | 0.37 |

Examples 5 and 6 and Comparative Example 3

The same procedure as in Example 1 was repeated to give three kinds of acicular α-ferric oxide, except that aging was carried out at 50° C., 85° C., or 20° C. The results are shown in Table 2.

TABLE 3

|  |  | Examples | | Comparative Examples |
|---|---|---|---|---|
|  |  | 5 | 6 | 3 |
| Ageing temperature (°C.) |  | 50 | 85 | 20 |
| Properties of acicular α-ferric oxide | Specific surface area (m$^2$/g) | 23.2 | 38.7 | 16.8 |
|  | Aspect ratio | 12 | 12 | 10 |
|  | $D_{10\bar{1}4}$ (Å) | 382 | 319 | 402 |
|  | $D_{11\bar{2}0}$ (Å) | 293 | 257 | 295 |
|  | $D_{10\bar{1}4}/D_{11\bar{2}0}$ | 1.30 | 1.24 | 1.36 |
| Properties of acicular γ-ferric oxide | Coercive force (Oe) | 420 | 410 | 417 |
|  | Saturation magnetization (emu/g) | 72.0 | 70.9 | 71.9 |
| Properties of magnetic tape | Switching field distribution | 0.28 | 0.30 | 0.46 |

Example 7 and 8 and Comparative Example 4

The same procedure as in Example 1 was repeated to give three kinds of acicular α-ferric oxide, except that neutralization was carried out at 5° C., 20° C., or 50° C. The results are shown in Table 4.

TABLE 4

|  |  | Examples | | Comparative Examples |
|---|---|---|---|---|
|  |  | 7 | 8 | 4 |
| Neutralization temperature (°C.) |  | 5 | 20 | 50 |
| Properties of acicular α-ferric oxide | Specific surface area (m$^2$/g) | 34.3 | 32.5 | 28.8 |
|  | Aspect ratio | 13 | 12 | 9 |
|  | $D_{10\bar{1}4}$ (Å) | 340 | 334 | 352 |
|  | $D_{11\bar{2}0}$ (Å) | 265 | 270 | 283 |
|  | $D_{10\bar{1}4}/D_{11\bar{2}0}$ | 1.28 | 1.24 | 1.24 |
| Properties of acicular γ-ferric oxide | Coercive force (Oe) | 415 | 417 | 415 |
|  | Saturation magnetization (emu/g) | 71.3 | 71.3 | 71.8 |
| Properties of magnetic tape | Switching field distribution | 0.27 | 0.32 | 0.44 |

Comparative Example 5

A suspension of ferrous hydroxide was prepared from ferrous sulfate and alkali, and acicular α-FeOOH was prepared by blowing air into the suspension. The acicular α-FeOOH was changed into acicular α-ferric oxide by dehydration with heating at 650° C. for 1 hour.

The acicular α-ferric oxide was found to have a specific surface area of 38.0 m$^2$/g, an aspect ratio of 11, and crystallite diameters ($D_{10\bar{1}4}$ and $D_{11\bar{2}0}$) of 160 Å and 254 Å, respectively, with the $D_{10\bar{1}4}/D_{11\bar{2}0}$ ratio being 0.63.

The acicular γ-ferric oxide was found to have a coercive force of 392 Oe and a saturation magnetization of 69.5 emu/g, and the resulting magnetic tape was found to have a switching field distribution of 0.40.

What is claimed is:

1. Fine acicular α-ferric oxide which has a crystallite diameter ($D_{10\bar{1}4}$) in the direction perpendicular to the (10$\bar{1}$4) plane and a crystallite diameter ($D_{11\bar{2}0}$) in the direction perpendicular to the (11$\bar{2}$0) plane such that the ratio $D_{10\bar{1}4}/D_{11\bar{2}0}$ is in the range of 1–2, and has a specific surface area in the range of 40–50 m$^2$/g.

2. A process for producing fine acicular α-ferric oxide which comprises simultaneously neutralizing an aqueous solution of ferric salt and an alkaline aqueous solution by adding the aqueous solution of ferric salt and the alkaline aqueous solution into a vessel simultaneously while keeping the resulting mixture at a pH in the range of 7–9 and at a temperature of not more than 40° C., thereby providing a first suspension of ferric hydroxide solids, filtering the first suspension and water-washing the solids, dispersing the solids in water to form a second ferric hydroxide suspension, such that the amount of SiO$_2$ in the resultant second suspension of ferric hydroxide is not more than 30 ppm and the amount of anions originating from the ferric salt used as a starting material is not more than 1000 ppm, aging the second suspension at a temperature of 40°–80° C., adding a crystallization controlling agent to the second suspension, and subjecting the second suspension to hydrothermal reaction to form said α-ferric oxide.

3. The process as claimed in claim 1, wherein the hydrothermal reaction is carried out by heating the second suspension of ferric hydroxide to a temperature of more than 100° C. with its pH adjusted to 9–11.

4. A process for producing fine acicular α-ferric oxide which comprises adding an alkaline aqueous solution to an aqueous solution of ferric salt until the resulting mixture has a pH of 7–10 while keeping the resulting mixture at a temperature of not more than 30° C., thereby providing a first suspension of ferric hydroxide solids, filtering the first suspension and water-washing the solids, dispersing the solids in water to form a second ferric hydroxide suspension, such that the amount of SiO$_2$ in the resultant second suspension of ferric hydroxide is less than 60 ppm and the amount of anions origination from the ferric salt used as a starting material is not more than 2000 ppm, aging the second suspension at a temperature of 40°–100° C., adding a crystallization controlling agent to the second suspension, and subjecting the second suspension to hydrothermal reaction to form said α-ferric oxide.

5. The process as claimed in claim 4, wherein the hydrothermal reaction is carried out by heating the second suspension of ferric hydroxide to a temperature of more than 100° C. with its pH adjusted to 9–11.

* * * * *